United States Patent [19]

Hirsch

[11] Patent Number: 6,105,121
[45] Date of Patent: Aug. 15, 2000

[54] DATA PROCESSING AND DATA TRANSMISSION SYSTEM

[75] Inventor: Lucian Hirsch, Munich, Germany

[73] Assignee: Siemens Aktiengesellschaft, Munich, Germany

[21] Appl. No.: 08/926,250

[22] Filed: Sep. 5, 1997

Related U.S. Application Data

[62] Continuation of application No. 08/561,117, Nov. 20, 1995, abandoned, which is a continuation of application No. 08/108,668, filed as application No. PCT/DE92/00099, Feb. 13, 1993, abandoned.

[30] Foreign Application Priority Data

Feb. 28, 1991 [DE] Germany ............................ 41 06 454

[51] Int. Cl.[7] .................................................. G06F 15/00
[52] U.S. Cl. ................................ 712/1; 712/28; 709/200
[58] Field of Search ........................... 395/800.1, 800.01, 395/200.3; 712/1, 28; 709/200, 201, 202

[56] References Cited

U.S. PATENT DOCUMENTS

| | | | |
|---|---|---|---|
| 3,751,582 | 8/1973 | Wernikoff et al. | 178/6 |
| 3,830,962 | 8/1974 | Mailloux | 178/6 |
| 4,652,933 | 3/1987 | Koshiishi | 358/256 |
| 4,782,442 | 11/1988 | Kojima et al. | 709/220 |
| 4,816,911 | 3/1989 | Kirsch et al. | 358/256 |
| 4,821,107 | 4/1989 | Naito et al. | 358/256 |
| 4,918,588 | 4/1990 | Barrett et al. | 364/200 |
| 4,918,722 | 4/1990 | Duehren et al. | 379/100 |
| 4,920,427 | 4/1990 | Hirata | 358/437 |
| 4,965,676 | 10/1990 | Ejiri et al. | 358/406 |

(List continued on next page.)

FOREIGN PATENT DOCUMENTS

| | | |
|---|---|---|
| 3431754 | 4/1985 | Germany . |
| WO 90/09716 | 8/1990 | WIPO . |

OTHER PUBLICATIONS

Japanese Patent No. 1–221041—annex 1—Answer 1 of 6 JAPIO 89–221041.
Japanese Patent No. 86–292467—annex 2—Answer 2 of 6 JAPIO.
Japanese Patent No. 60–182851—annex 3—Answer 3 of 6 JAPIO 86–224655.
Japanese Patent No. 61–166629—annex 4—Answer 4 of 6 JAPIO 86–166629.
Japanese Patent No. 61–26740—annex 5—Answer 5 of 6 JAPIO 86–006740.
Japanese Patent No. 61–224655—annex 6—Answer 6 of 6 JAPIO 85–182851.
"AT&T Fax Products & Services Speed the Written Message", J. S. Licwinko, et al, AT&T Technology, vol. 4, No. 2, (1989) pp. 12–17.
"Remote Configuration of PC Driven Fascimile System", IBM Technical Disclosure Bulletin, vol. 33, No. 1B, Jun. 1990, pp. 363.
"Multifunction Peripherals Will Overcome", by D. Throwbridge, Computer Technology Review, vol. 10, No. 15, Dec. 1990, pp. 52–26.

*Primary Examiner*—Meng-Ai T. An
*Assistant Examiner*—Mackly Monestime
*Attorney, Agent, or Firm*—Hill & Simpson

[57] ABSTRACT

A data processing and data transmission system, in which a personal computer is coupled to a facsimile unit via an interface device for transmission and receipt of facsimile messages. The facsimile unit contains functional groups for optional access of the personal computer. When the personal computer is switched on, a background program runs which implements the connection to the facsimile unit, is stored in a main memory of the personal computer and is designed for optional access of the personal computer to the functional groups of the facsimile unit. Commands which control optional access can be input at an operator's station of the personal computer. These commands can be converted into control commands for the facsimile unit by means of a PC interpreter.

13 Claims, 1 Drawing Sheet

U.S. PATENT DOCUMENTS

| | | | |
|---|---|---|---|
| 4,974,254 | 11/1990 | Perine et al. | 379/100 |
| 4,989,238 | 1/1991 | Iggluden et al. | 379/100 |
| 4,991,200 | 2/1991 | Lin | 379/100.15 |
| 4,996,707 | 2/1991 | O'Malley et al. | 379/100.13 |
| 5,091,790 | 2/1992 | Silverberg | 358/434 |
| 5,142,624 | 8/1992 | Patrick, II | 709/242 |
| 5,157,519 | 10/1992 | Jacobs | 358/470 |
| 5,170,266 | 12/1992 | Marsh et al. | 358/468 |
| 5,175,762 | 12/1992 | Kochis et al. | 379/100 |
| 5,210,873 | 5/1993 | Gay et al. | 709/107 |
| 5,218,458 | 6/1993 | Kochis et al. | 358/448 |
| 5,247,575 | 9/1993 | Sprague et al. | 380/9 |
| 5,307,462 | 4/1994 | Hastings | 395/275 |
| 5,321,802 | 6/1994 | Furuya et al. | 358/403 |
| 5,454,066 | 9/1995 | Tsai . | |
| 5,548,700 | 8/1996 | Bagley et al. . | |

DATA PROCESSING AND DATA TRANSMISSION SYSTEM

This is a continuation of application Ser. No. 08/561,117, filed Nov. 20, 1995 now abandoned, which is a continuation of application Ser. No. 08/108,668 filed Aug. 25, 1993 now abandoned, which is a 371 of PCT/DE92/0009 Feb. 13, 1992.

BACKGROUND OF THE INVENTION

The invention relates to a data processing and data transmission system, in which a personal computer is provided which is coupled to a facsimile unit via an interface device for transmission and receipt of facsimile messages, the facsimile unit containing functional groups for optional access of the personal computer.

A PC-fax system is known from the document AT & T Technology, Vol. 4, No. 2, 1989, Short Hills, N.J., US, pages 12 to 17; J. S. Licwinko et al. entitled "AT & T Fax Products and Services Speed The Written Message", in which a fax card is arranged in a personal computer. Fax messages can be transmitted and/or received using the personal computer owing to the fax card arranged in the personal computer. The fax messages can be displayed on a screen of the personal computer and output via a printer connected to the personal computer. The PC fax card offers an interesting alternative to the conventional facsimile unit for the transmission and receipt of fax messages. It is, however, a disadvantage of the solution using the PC fax card that the personal computer with the integrated fax card must be always kept switched on so as to be ready to receive faxes. This means that all the functional units in the personal computer are constantly in a state of operational readiness, even though this state of operational readiness is sometimes not at all desired.

A PC/facsimile system is known from the document IBM Technical Disclosure Bulletin, Vol. 33, No. 1B, June 1990, Armonk, N.Y., US; page 363, entitled "Remote Configuration of a PC-Driven Facsimile System", in which a method is specified for automatically configuring the PC/facsimile system for the first time.

A computer system is known from WO90/09716 which is coupled to a fax transceiving device, which is in its turn connected via a call router to a remote facsimile unit, telephone or computer. The fax transceiving device is preferably integrated into the computer system as a fax card. It is, however, also possible as an alternative for the fax transceiving device to be designed as a facsimile unit, but it must then be ensured that the facsimile unit passes on a fax message which it has received to a memory of the computer system in the form of a digital signal.

An image information processing system is known from the German reference DE-A1-34 31 754, in which a facsimile unit and a personal computer are connected to one another by means of eight parallel data lines, a pair of unidirectional control signal lines and three bidirectional control signal lines. The following four operating modes of the image information processing system are made possible by these connections:
(a) A recording mode, in which the data is recorded by the computer via a plotter in the facsimile unit,
(b) an image input mode, in which the data is input by a scanner in the facsimile unit into the computer,
(c) a transmission/transfer mode, in which the data is passed by the computer to another facsimile unit and is transmitted thereby, and
(d) a receipt/transfer mode, in which the data is input into the computer by another facsimile unit.

SUMMARY OF THE INVENTION

The object of the invention is to specify a data processing and data transmission system which is of simple structure and can be used as a multi-functional communications system in a versatile manner.

This object is achieved on the basis of the data processing and data transmission system in which a personal computer is coupled to a facsimile unit via an interface device for transmission and receipt of facsimile messages. The facsimile unit contains functional groups for optional access of the personal computer. When the personal computer is switched on, a background program runs which implements the connection to the facsimile unit, is stored in a main memory of the personal computer and is designed for optional access of the personal computer to the functional groups of the facsimile unit. Commands which control optional access can be input at an operator's station of the personal computer. These commands can be converted into control commands for the facsimile unit by means of a PC interpreter.

This results in the advantage that the personal computer can be used as a work station for facsimile transmission, PC transmission tasks and copying operations, as well as exclusively as a PC work station.

Advantageous developments of the invention are as follows.

The functional groups include a scanner, printer, document and facsimile memories and/or a terminal unit for the connection of remote data processing and data transmission systems.

The background program stored in the main memory runs independently of other programs in the personal computer.

Each control command triggers an acknowledgement to the personal computer, this acknowledgement being stored as a protocol in a command-specific manner.

There is a change of format from fax format to graphical format and vice versa when messages and documents are transmitted.

A display on the facsimile unit is also displayable on a screen of the personal computer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

It is an essential feature of the data processing and data transmission system according to the invention that all the aforementioned assemblies of the facsimile unit and the personal computer, which will be referred to only as PC below, are envisaged as logical assemblies which operate in terms of function independently of one another. It is assumed for all functions of this PC-fax coupling that activation (operation) is from the PC, by transmission from the latter in each case of an "initialization block" in a defined command language which can be processed by the facsimile unit. Each time a command is sent to it, the facsimile unit responds with a command-specific response, which is stored in the PC for any checking which may be necessary. In order to carry out this procedure at any time, a background program stored in the main memory AS of the PC in principle runs whenever the PC is switched on. In this manner, the keyboard of the PC becomes the operator's console for both the PC and for the facsimile unit.

Figure 1:
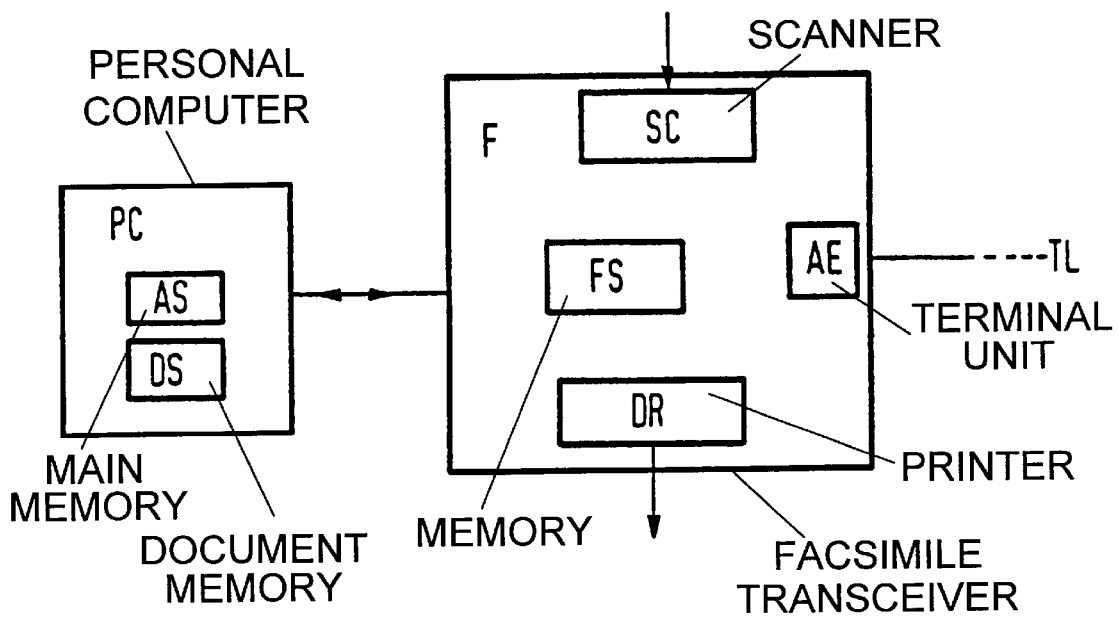
FIG. 1 represents a facsimile transceiver F having the assemblies scanner SC, facsimile memory FS, printer DR and terminal unit AE, as well as a personal computer PC having the assemblies main memory AS and document memory DS.
Figure 2:
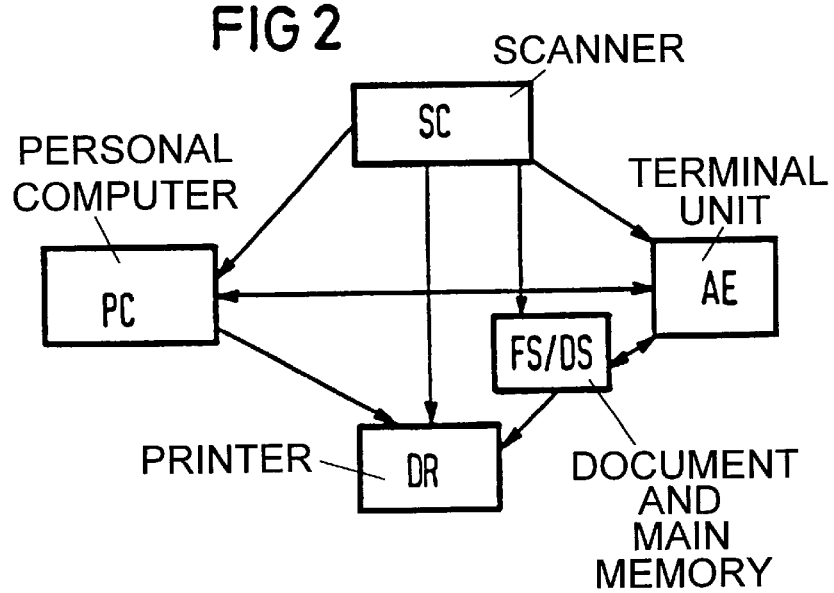
FIG. 2 displays the individual functional groups of the system, comprising personal computer PC, scanner SC, document and main memories FS/DS, printer DR and terminal unit AE, and how they might interact.

According to FIG. 2, an internal process can in principle be handled using the PC. A remote PC or a remote station can, according to the invention, be connected via the connecting unit AE of the facsimile unit and via the subscriber line TL. Printing out of a document stored in the facsimile memory FS or in the document memory DS of the PC using the printer DR of the facsimile unit can be actuated by the PC. Furthermore, the PC can cause a document which is available in an optical form to be read by means of facsimile scanners SC and stored or passed on via the terminal unit.

Single or sorted multiple copies can also be produced using this system. The illustrated PC-fax system can therefore act as a complete data processing system. When it is used in this way, the facsimile memory FS can also be omitted. Storage in this memory is in the fax format (pixel format), so that the capacity is exhausted relatively rapidly. Storage in the document memory DS of the PC is in a graphical format (conversion by means of a conversion device which is not illustrated), on the other hand, as a result of which the storage capacity can be substantially increased.

Furthermore, the screen of the PC can also be used in the event of failure of the display provided on the facsimile unit and for monitoring errors relating to the facsimile unit, for example.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for setting up a data processing and data transmission system using a stand-alone facsimile device and a stand-alone personal computer, the personal computer having a coupling to the facsimile device, the personal computer being controlled by an operator's station, the personal computer having a main memory, the main memory effecting the coupling of the personal computer to the facsimile device, comprising the steps of:

providing a personal computer having a main memory;

providing a stand-alone facsimile device;

loading a software background program into the main memory of the personal computer;

running the background program when the personal computer is switched on;

implementing via the background program a connection to the facsimile device for transmitting and receiving facsimile messages in fax format between the personal computer and the facsimile device and to process said facsimile messages;

entering commands at the operator's station of the personal computer; and converting said commands into facsimile device-associated control commands, and transmitting said commands in an initialization block from the personal computer to the facsimile device.

2. The method as claimed in claim 1, wherein the background program runs without interfering with local operation on the personal computer.

3. The method as claimed in claim 1, wherein the method further comprises triggering an acknowledgment for the personal computer by each of said control commands, said acknowledgment being stored in a protocol memory of the personal computer in a command-specific manner.

4. The method as claimed in claim 1, wherein the method further comprises changing format from a fax format to a graphical format, that can be processed by the personal computer and vice versa, in the personal computer when messages are interchanged between the facsimile device and the personal computer in order, to send or to print messages produced by the personal computer, or, to store received or scanned facsimile messages in the personal computer.

5. The method as claimed in claim 1, wherein the method further comprises displaying functions on a screen of the personal computer for monitoring errors relating to the facsimile device.

6. A software method for setting up a data processing and data transmission system using a stand-alone facsimile device and a stand-alone personal computer, the personal computer having a coupling to the facsimile device, the personal computer being controlled by an operator's station, the personal computer having a main memory, the main memory effecting the coupling of the personal computer to the facsimile device, comprising the steps of:

providing a personal computer having a main memory;

providing a stand-alone facsimile device;

loading a software background program into the main memory of the personal computer;

running the background program when the personal computer is switched on and running the background program without interfering with running of other programs in the personal computer;

implementing via the background program a connection to the facsimile device for transmitting and receiving facsimile messages in fax format between the personal computer and the facsimile device and to process said facsimile messages;

entering commands at the operator's station of the personal computer;

converting said commands into facsimile device-associated control commands, and transmitting said commands in an initialization block from the personal computer to the facsimile device; and triggering an acknowledgment for the personal computer by each of said control commands, said acknowledgment being stored in a protocol memory of the personal computer in a command-specific manner.

7. The method as claimed in claim 6, wherein the method further comprises changing format from a fax format to a graphical format, that can be processed by the personal computer and vice versa, in the personal computer when messages are interchanged between the facsimile device and the personal computer in order, to send or to print messages produced by the personal computer, or, to store received or scanned facsimile messages in the personal computer.

8. The method as claimed in claim 6, wherein the method further comprises displaying functions on a screen of the personal computer for monitoring errors relating to the facsimile device.

9. A method for setting up a data processing and data transmission system using a stand-alone facsimile device and a stand-alone personal computer, the personal computer having a coupling to the facsimile device, the personal computer being controlled by an operator's station, the personal computer having a main memory, the main memory effecting the coupling of the personal computer to the facsimile device, comprising the steps of:

providing a personal computer having a main memory;

providing a stand-alone facsimile device;

loading a software background program into the main memory of the personal computer;

running the background program when the personal computer is switched on and running the background program without interfering with running of other programs in the personal computer;

implementing via the background program a connection to the facsimile device for transmitting and receiving facsimile messages in fax format between the personal computer and the facsimile device and to process said facsimile messages;

entering commands at the operator's station of the personal computer;

converting said commands into facsimile device-associated control commands and transmitting said commands in an initialization block from the personal computer to the facsimile device;

triggering an acknowledgment for the personal computer by each of said control commands, said acknowledgment being stored in a protocol memory of the personal computer in a command-specific manner; and changing format from a fax format to a graphical format, that can be processed by the personal computer and vice versa, in the personal computer when messages are interchanged between the facsimile device and the personal computer in order, to send or to print messages produced by the personal computer, or, to store received or scanned facsimile messages in the personal computer.

10. A method for setting up a data processing and data transmission system using a stand-alone facsimile device and a stand-alone personal computer, the personal computer having a coupling to the facsimile device, the personal computer being controlled by an operator's station, the personal computer having a main memory, the main memory effecting the coupling of the personal computer to the facsimile device, comprising the steps of:

providing a personal computer having a main memory;

providing a stand-alone facsimile device having a memory and a printer;

loading a software background program into the main memory of the personal computer;

running the background program when the personal computer is switched on;

implementing via the background program a connection to the facsimile device for transmitting and receiving facsimile messages in fax format between the personal computer and the facsimile device and to process said facsimile messages;

entering commands at the operator's station of the personal computer;

converting said commands into facsimile device-associated control commands, for controlling said printer in the facsimile device and for controlling the transmission of facsimile messages by the facsimile device, and transmitting said commands in an initialization block from the personal computer to the facsimile device;

storing a document in at least one of said main memory of said personal computer and said memory of said facsimile device;

printing out said stored document using said printer of said facsimile device, said printer being actuated by a control command from said personal computer for printing out of said stored document.

11. A data processing and data transmission system, comprising:

a stand-alone personal computer which is coupled to a stand-alone facsimile unit via an interface device;

a background program such that, when the personal computer is switched on, the background program runs and implements a connection to the facsimile unit, the background program being stored in a main memory of the personal computer; and a keyboard connected to the personal computer, the keyboard functioning as an input for computer commands to the personal computer and for control commands to the facsimile unit.

12. The data processing and data transmission system as claimed in claim 11, wherein the personal computer has other programs stored therein and wherein the background program stored in the main memory runs independently of other programs in the personal computer.

13. The data processing and data transmission system as claimed in claim 11, wherein each control command of said control commands triggers an acknowledgment to the personal computer, said acknowledgment being stored as a protocol in a command-specific manner.

* * * * *